United States Patent [19]

Sternberg et al.

[11] Patent Number: 4,760,607
[45] Date of Patent: Jul. 26, 1988

[54] APPARATUS AND METHOD FOR IMPLEMENTING TRANSFORMATIONS IN GRAYSCALE IMAGE PROCESSING

[75] Inventors: Stanley R. Sternberg; Glenn Herteg; Martin P. Koskella, all of Ann Arbor; Robert S. Rau, Ypsilanti, all of Mich.

[73] Assignee: Machine Vision International Corporation, Ann Arbor, Mich.

[21] Appl. No.: 891,311

[22] Filed: Jul. 31, 1986

[51] Int. Cl.⁴ ............................................. G06K 9/00
[52] U.S. Cl. .................................................. 382/49
[58] Field of Search ........................... 382/49, 41, 27; 358/283

[56] References Cited

U.S. PATENT DOCUMENTS

| | | | |
|---|---|---|---|
| 3,761,876 | 9/1973 | Flaherty et al. | 382/35 |
| 3,805,035 | 4/1974 | Serra | 382/49 |
| 3,959,771 | 5/1976 | Uno et al. | 382/48 |
| 4,122,496 | 10/1978 | Childress et al. | 358/283 |
| 4,167,728 | 9/1979 | Sternberg | 382/49 |
| 4,242,662 | 12/1980 | Tsujiyama et al. | 382/8 |
| 4,288,779 | 9/1981 | Otsu et al. | 382/18 |
| 4,290,049 | 9/1981 | Sternberg et al. | 382/49 |
| 4,301,443 | 11/1981 | Sternberg et al. | 382/49 |
| 4,322,716 | 3/1982 | Sternberg | 382/49 |
| 4,345,312 | 8/1982 | Yasuye et al. | 358/106 |
| 4,395,697 | 7/1983 | Dargel et al. | 382/49 |
| 4,395,698 | 7/1983 | Sternberg et al. | 382/49 |
| 4,395,699 | 7/1983 | Sternberg | 382/49 |
| 4,395,700 | 7/1983 | McCubbrey et al. | 382/27 |
| 4,398,176 | 8/1983 | Dargel et al. | 382/27 |
| 4,414,685 | 11/1983 | Sternberg | 382/49 |
| 4,442,543 | 4/1984 | Sternberg et al. | 382/49 |
| 4,464,788 | 8/1984 | Sternberg et al. | 382/49 |
| 4,484,346 | 11/1984 | Sternberg et al. | 382/27 |
| 4,541,114 | 9/1985 | Rutenbar et al. | 382/49 |
| 4,635,292 | 1/1987 | Mori et al. | 382/49 |
| 4,641,356 | 2/1987 | Sternberg | 382/49 |
| 4,665,551 | 5/1987 | Sternberg et al. | 382/49 |
| 4,665,554 | 5/1987 | Sternberg | 382/27 |

FOREIGN PATENT DOCUMENTS

| | | |
|---|---|---|
| 0132134 | 1/1985 | European Pat. Off. . |
| 0145477 | 6/1985 | European Pat. Off. . |
| 0177160 | 4/1986 | European Pat. Off. . |

OTHER PUBLICATIONS

Makhlin, "Grey Scale Robot Vision for Real-Time Inspection and Assembly".
Unger, "A Computer Oriented Toward Spatial Problems", *Proceedings of the IRE*, pp. 1744–1750, (Oct. 1958).
McCormick, "The Illinois Pattern Recognition Computer—ILLIAC III", *IEEE Transactions on Electronic Computers*, pp. 791–813, (Dec. 1963).
Golay, "Hexagonal Parallel Pattern Transformations", *IEEE Transactions on Computers*, vol. C-18, No. 8, pp. 733–739, (Aug. 1969).
Preston et al., "Basics of Cellular Logic with Some Applications in Medical Image Processing", *Proceedings of the IEEE*, vol. 67, No. 5, pp. 826–859, May (1979).
Gerritsen et al., "Design and Use of DIP-1: A Fast, Flexible and Dynamically Microprogrammable Pipelined Image Processor", (Jan. 1980).
Batcher, "Design of a Massively Parallel Processor", *IEEE Transactions on Computers*, vol. C-29, No. 9, pp. 836–840, (Sep. 1980).
Danielsson et al., "Computer Architectures for Pictorial Information Systems" *Computer*, pp. 53–67 (Nov. 1981).
Sternberg, "Computer Architectures Specialized for Mathematical Morphology", Workshop on Algorithmically Specialized Computer Organizations, Purdue University (Sep. 29–Oct. 1, 1982).

*Primary Examiner*—Leo H. Boudreau
*Attorney, Agent, or Firm*—Price, Heneveld, Cooper, DeWitt & Litton

[57] ABSTRACT

The specification discloses a system and method for processing serialized digital representations of grayscale images. The system includes a geometric logic unit through which the serialized representations are passed. The geometric logic unit includes an arithmetic logic unit (ALU) and an ALU controller which operate on the serialized signal and a delayed version thereof on a word-by-word basis. The function unit is capable of performing a dynamically selectable function and appropriately clips the resultant data to maintain the data within range.

13 Claims, 4 Drawing Sheets

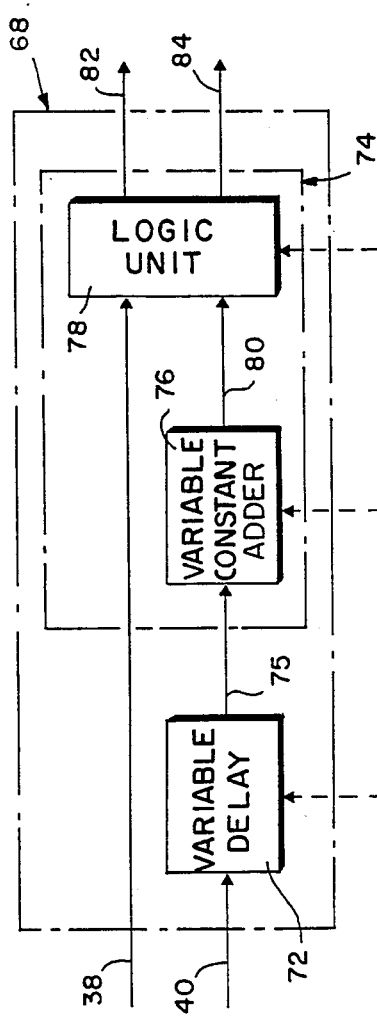
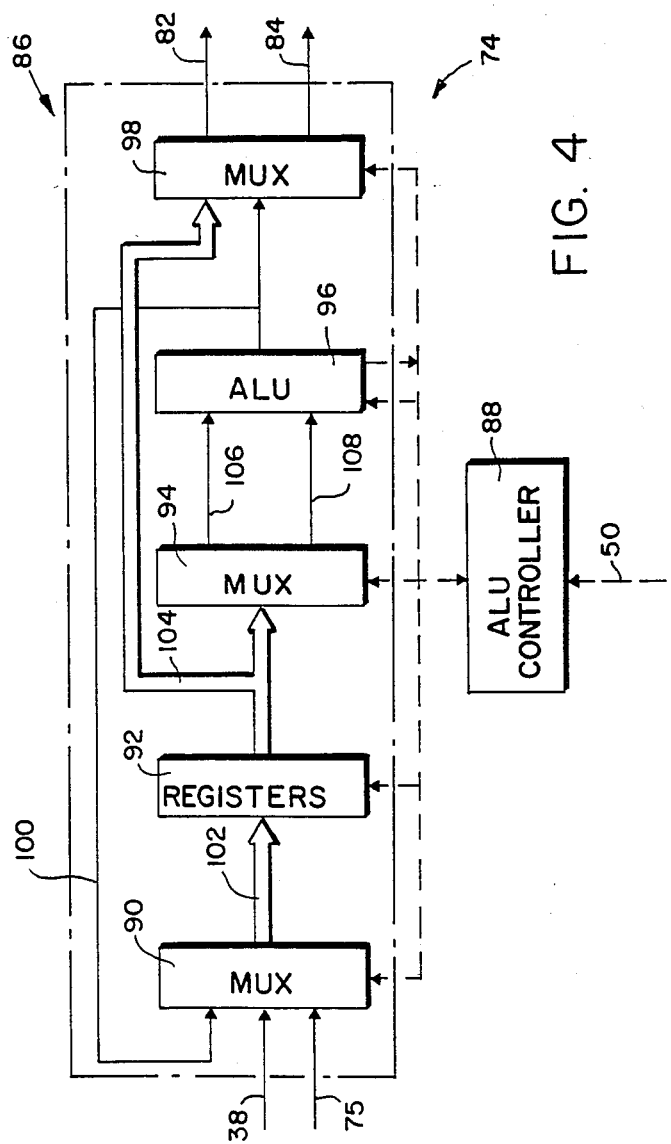
FIG. 3
FIG. 4

BOUNDED CASE

| Data In | | Data Out | | | | | | | |
|---|---|---|---|---|---|---|---|---|---|
| | | Clone | | Collapse | | Explode | | Implode | |
| C1 | C2 | F-OUT | D-OUT | F-OUT | D-OUT | F-OUT | D-OUT | F-OUT | D-OUT |
| 0 | 0 | E | E | F-IN | F-IN | F-IN | E | F-IN | F-IN |
| 0 | 1 | F-IN | F-IN | E | 0 | F-IN | F-IN | F-IN | E |
| 1 | 0 | LIMIT | LIMIT | 0 | 0 | F-IN | LIMIT | F-IN | 0 |
| 1 | 1 | LIMIT | LIMIT | 0 | 0 | F-IN | LIMIT | F-IN | 0 |

FIG. 6

APPARATUS AND METHOD FOR IMPLEMENTING TRANSFORMATIONS IN GRAYSCALE IMAGE PROCESSING

BACKGROUND OF THE INVENTION

The present invention relates to image processing systems and methods, and more particularly to digital systems and methods for processing grayscale images.

A wide variety of image processing systems have been developed enabling digital computers to "see" or "read" an image. Typically, these image processors include a video camera, an analog-to-digital converter for digitizing the video signal produced by the camera, and a digital system for processing the digitized information. For example, the image can be digitized into a matrix, or lattice, of pixels with each of 512 video scan lines divided into 512 pixels. In a nongrayscale, or binary, image, each pixel can be encoded in a single bit, which is set to zero if the pixel is dark and set to one if the pixel is illuminated. In a grayscale image, each pixel is encoded in a multibit word which is set to a value corresponding to the illumination intensity of the pixel. Grayscale images are more realistic and detailed than nongrayscale images. The image processors scan the digital images and process the digital information to interpret the image.

One extremely efficient nongrayscale image processor is disclosed in U.S. patent application Ser. No. 559,438, filed Dec. 8, 1983, by Sternberg et al., now U.S. Pat. No. 4,665,551, entitled APPARATUS AND METHOD FOR IMPLEMENTING TRANSFORMATIONS IN DIGITAL IMAGE PROCESSING (hereinafter "the Sternberg binary processor"). This processor includes digital circuitry for effecting dilations and other transformations of serialized bit-wide streams representative of nongrayscale images. More specifically, the processor includes a plurality of sequentially coupled logic units, each including a delay unit for delaying the serialized stream and a function unit for performing any one of a plurality of logical operations on the delayed and undelayed streams on a bit-by-bit basis. However, the Sternberg binary processor is capable of processing only bit-wide, or binary, data streams.

One extremely efficient grayscale image processor is disclosed in U.S. patent application Ser. No. 644,101, filed August 24, 1984, by Sternberg, now U.S. Pat. No. 4,641,356, entitled APPARATUS AND METHOD FOR IMPLEMENTING DILATION AND EROSION TRANSFORMATIONS IN GRAYSCALE IMAGE PROCESSING (hereinafter "the early Sternberg grayscale processor"). This processor includes digital circuitry for effecting dilations and erosions of serialized multibit wide streams representative of grayscale images. More specifically, the processor includes one or more sequentially coupled logic units, each including a delay unit for delaying the serialized streams, an adder for adding a constant value to each word in the delayed stream, and a comparator unit for selecting the larger of the delayed and undelayed streams on a word-by-word basis.

In further development of the early Sternberg grayscale processor, it has been recognized that the processor has two limitations. First, the operation of the logic units is not bounded. Consequently, manipulations of grayscale images occasionally produce data which exceeds the range of the processor's multibit format, producing virtual images which are difficult or even impossible to interpret. Second, the function unit is capable of selecting only a maximum value on a word-by-word basis between the delayed and undelayed streams. Consequently, the processor is capable of only dilation and erosion. The early Sternberg grayscale processor is therefore incapable of effecting many desired image transformations.

Another image processor, less efficient than the previously described Sternberg processors, routes a grayscale serial signal sequentially through several neighborhood transformations to detect limited image features. Disclosures of this processor are provided in U.S. Pat. No. 4,395,699, issued July 26, 1983, to Sternberg, entitled METHOD AND APPARATUS FOR PATTERN RECOGNITION AND DETECTION, and U.S. Pat. No. 4,322,716, issued Mar. 30, 1982, to Sternberg, entitled METHOD AND APPARATUS FOR PATTERN RECOGNITION AND DETECTION. At each neighborhood transformation stage, the "neighborhood" of pixels surrounding a given pixel in one image is examined and the corresponding pixel in the new image is given a value which is a function of the neighborhood pixels in the old image. All neighborhood pixels in an image are made available for processing by serially routing the digital image through one or more fixed-length shift registers. As the image is shifted through the registers, the appropriate register locations are simultaneously accessed to process a particular neighborhood. This neighborhood processor has drawbacks. First, the entire neighborhood of a pixel must be made available and examined before the corresponding pixel in the new image can be given a value. This requires excessively complicated circuitry to make the neighborhood pixels simultaneously available to drive the neighborhood function generator. Second, the neighborhood processing theory is an inefficient and cumbersome method of effecting many image transformations. Third, the neighborhood theory greatly restricts the operations which can be performed, due to the limited size or extent of the neighborhood.

SUMMARY OF THE INVENTION

The aforementioned problems are solved by the present invention. Essentially, a grayscale image processor and method are provided for effecting a wide variety of image transformations of grayscale images at improved speeds, accuracies, and efficiencies using simplified circuitry. More particularly, the image processor includes a geometric logic unit (GLU) for receiving at least one input image and outputting at least one output image. The GLU includes at least one GLU stage, which each in turn include a delay element and a function unit. The function unit in turn includes an arithmetic logic unit (ALU) and an ALU controller. One of the received images is selected through multiplexing and inputted to a delay element which time delays the serial signal. The function unit of the GLU stage then operates on the undelayed and delayed serial streams on a word-by-word basis. First, a preselected constant value is added to the delayed data to produce an "enhanced" data serial stream; and the ALU controller sets a first flag responsive to whether an overflow occurred during such addition. Second, the enhanced data is subtracted from the undelayed data; and the ALU controller sets a second flag responsive whether underflow occurred during such subtraction. Third, the output of the ALU is formed by selecting on a word-by-word basis (1) a limit value, (2) the undelayed data word, or (3) the enhanced data word depending upon whether overflow and/or underflow occurred during the addition and/or subtraction, respectively.

The described function unit performs rapidly, accurately, and efficiently. The function unit "clips" the output data to insure that data which overflows is not outputted in the output stream. Put another way, if the function unit results are too large to be represented in the multibit format, the function unit clips this information at the maximum value which can be represented in the format. This vastly improves the ease of image interpretation. Second, the defined system enables the GLU to be implemented using a conventional ALU and a specialized ALU controller. This reduces the cost of the system and increases the reliability of the system.

These and other objects, advantages, and features of the invention will be more fully understood and appreciated by reference to the drawings and the detailed description of the preferred embodiment.

BRIEF DESCRIPTION OF THE DRAWINGS

FIG. 3 is a schematic diagram of one stage of a GLU with the function unit illustrated conceptually;

FIG. 4 is a schematic diagram of the GLU stage function unit;

FIG. 6 is a logic table showing the output of the GLU stage function unit for various operations.

DETAILED DESCRIPTION OF THE PREFERRED EMBODIMENT

Image Processor Overview

Figure 1:
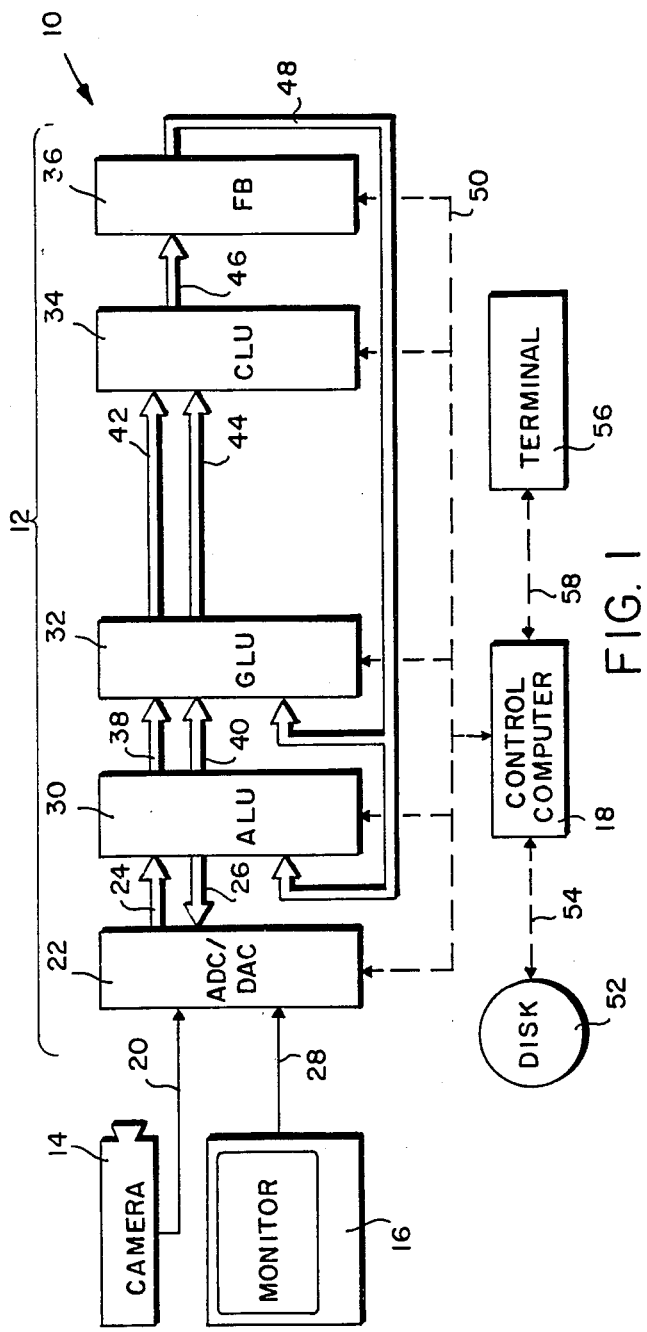
FIG. 1 is a schematic diagram showing the image processor of the present invention.

A grayscale image processor 10 constructed in accordance with a preferred embodiment of the invention is illustrated in FIG. 1, wherein data lines are illustrated as solid lines and control lines are indicated as broken lines. The processor 10 includes a processing unit 12, a camera 14, a monitor 16, and a control computer 18. The camera 14 provides real images to both the processing unit 12 and the monitor 16. The processing unit 12 is capable of manipulating the real images inputted by the camera 14 to produce a variety of virtual images, or image transformations, useful in analyzing the real image. The monitor 16 selectively displays either the real image observed by camera 14 or a virtual image produced by the processing unit 12. The control computer 18 provides appropriate control signals to the various elements of the processing unit 12 to manipulate or transform the grayscale images according to an algorithm to produce a desired virtual image usable for feature extraction or other imaging information.

The camera 14 provides a standard EAI RS170 signal on an output line 20. This analog composite video signal is transmitted over line 20 at a rate of 30 frames per second with either 480 or 512 horizontal scan lines per frame. An analog/digital converter 22 converts the analog serial signal received on the line 20 to a digital serial signal outputted on the bus 24 to the processing unit 12. Similarly, the converter 22 can convert a digital signal received on a bus 26 from the processing unit 12 to an analog signal on line 28 to be displayed on the monitor 16. Alternatively, the analog signal on the line 20 from the camera 14 can be passed directly to the monitor 16 via the line 28.

The digital signal on the eight-line bus 24 includes one eight-bit word for each pixel in the video image. The analog signal is digitized into 512 pixels per line on each of the 480 or 512 scan lines. Therefore, the processed image is made up of a matrix or lattice of points or pixels. The eight-bit word corresponding to a pixel is given a value between zero and 255 inclusive depending on the intensity of the analog signal (light intensity) of the pixel. the value zero corresponds to total lack of intensity (i.e., darkness), while the value 255 corresponds to maximum intensity.

The processing unit 12 includes an arithmetic logic unit (ALU) 30, a geometric logic unit (GLU) 32, a count/locate unit (CLU) 34, and a frame buffer memory 36. All data buses interconnecting the elements of the processing unit 12 are at least eight bits wide enabling the grayscale serial signal to be transmitted over any one of the data buses. A pair of eight-bit buses 38 and 40 interconnect the ALU and the GLU; a pair of eight-bit buses 42 and 44 interconnect the GLU 32 and the CLU 34; a 24-bit bus 46 interconnects the CLU 34 and the frame buffer 36; and a 24-bit bus 48 interconnects the frame buffer 36 and each of the ALU 30 and the GLU 32. When one or more digital representations in the frame buffer 36 is to be processed, each serial signal stream is outputted on the bus 48 to either the ALU 30 or the GLU 32. If more than one serial stream is processed at a time, the serial streams are transmitted in parallel over the bus 48. From the ALU 30, the signals pass sequentially through the GLU 32 and the CLU 34 before returning to the frame buffer 36. From the GLU 32, the signals pass through the CLU 34 before returning to the frame buffer 36.

The frame buffer memory 36 is three 512-by-512-by-8-bit storage devices enabling three separate grayscale digital images to be stored simultaneously therein. In the preferred embodiment, the frame buffer 36 is three Model FB512 storage devices manufactured by Imaging Technologies Incorporated of Wolburn, Mass. Under the control of the control computer 18, the content of any one or more of the images in the frame buffer 36 can be outputted onto the bus 48.

The arithmetic logic unit (ALU) 30 is a point or pixel processor, meaning that operations are carried out on the input image or images on a pixel-by-pixel basis to create one or two output images. The data bus 48 conveys one or two digital images from the frame buffer 36 to the ALU 30 for processing. The digital image or images created by the ALU 30 are outputted on either or both of the buses 38 and 40 to the GLU 32. In the preferred embodiment, the ALU 30 is a Model ALU512 arithmetic logic unit manufactured by Imaging Technologies Incorporated of Wolburn, Mass. The ALU 30 includes appropriate multiplexing at its front end to select the appropriate image or images from bus 48 to be processed by the ALU and outputted on either or both of the buses 38 and 40. The arithmetic functions which the ALU 30 is capable of performing include passing an image, adding two images, subtracting two images, multiplying two images, ANDing two images, ORing two images, or complementing an image.

The geometric logic unit (GLU) 32 is coupled to the ALU 30 by buses 38 and 40, to the CLU 34 by buses 42 and 44, and to the frame buffer 36 by bus 48. The GLU 32 is more clearly illustrated in FIGS. 2-4 to be described below Suffice it to say at this point that the GLU 32 receives one or more serial digital signals from the ALU 30 and/or the frame buffer 36 for processing. The digital image or images created by the GLU 32 are outputted on the buses 42 and 44 to the CLU 34.

The count/locate unit (CLU) 34 is connected by the buses 42 and 44 to the GLU 32 and by bus 46 to the frame buffer 36. One of two functions can be performed by the CLU 34 as the serial signal stream passes therethrough. The CLU 34 does not affect the values of the serial signal stream in either function. First, the CLU 34 can output on the Multibus 50 the coordinates of pixels within a given grayscale range. Second, the CLU 34 can output on Multibus 50 a frequency count, or histogram, of pixels within a given grayscale range. The output coordinates and the histogram information can be utilized by computer 18 in further control of the processing unit 12. The digital image or images exiting the CLU 32 on the bus 46 are identical to the image or images entering the CLU 32 on the buses 42 and 44.

Overall system control is provided by the control computer 18 which is coupled to the converter 22, the ALU 30, the GLU 32, the CLU 34, and the frame buffer 36 through the Multibus 50. Control signals are issued by the computer 18 over the Multibus 50 during each vertical retrace of the camera 14 to condition the processor 12 for a possible imaging operation during the next frame period of the camera. Whenever a digital image is processed, the serial signal is routed sequentially through either (1) the ALU 30, the GLU 32, and the CLU 34 or (2) the GLU 32 and the CLU 34 to return to the frame buffer 36. Each loop or processing pass through the processing unit 12 can be performed once and only once during each frame period to produce one or more digital images to be stored in the frame buffer 26. Each frame or image contains approximately one-quarter million (250,000) pixels. The ALU 30, the GLU 32, and the CLU 34 all operate at a speed of approximately 10 megahertz (MHz) to process one entire digital image during approximately one frame cycle and leave sufficient time for the control computer 18 to reprogram the processor 12 for operation during the next frame cycle. In the preferred embodiment, the computer 18 comprises an INTEL 80286 microcomputer having a minimum of 512 kilobytes (K) of memory.

Disk 52 is conventionally coupled through bus 54 to the computer 18 to provide the requisite secondary storage for the computer. A terminal 56 including a keyboard is conventionally coupled through a bus 58 to the computer 18 to provide a means of communicating command signals to the control computer.

The processing system 10 as thus far described is somewhat similar to the image processing system disclosed in U.S. patent application Ser. No. 644,101, filed Aug. 24, 1984, by Sternberg, now U.S. Pat. No. 4,641,356, entitled APPARATUS AND METHOD FOR IMPLEMENTING DILATION AND EROSION TRANSFORMATIONS IN GRAYSCALE IMAGE PROCESSING. The disclosure of that application is specifically incorporated herein by reference. The present system differs from the referenced system primarily in the construction of the GLU 32.

Geometric Logic Unit

Figure 2:
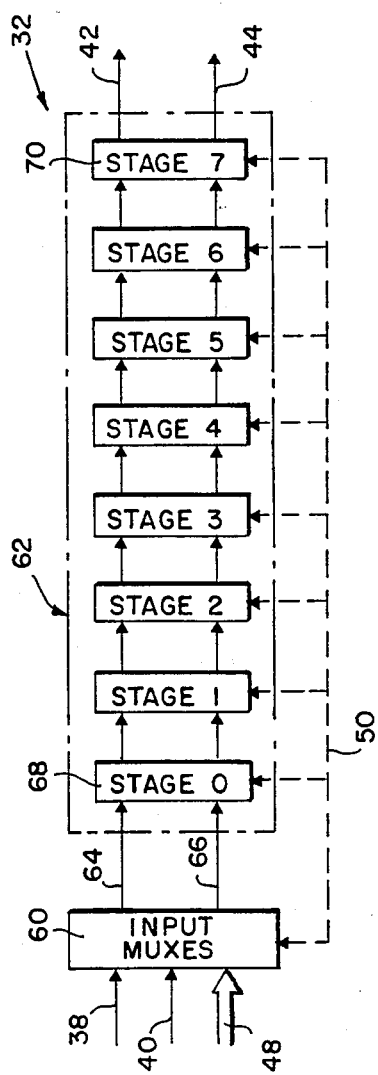
FIG. 2 is a schematic diagram of the geometric logic unit (GLU)

The geometric logic unit 32 is illustrated in greater detail in FIG. 2. Basically, the GLU includes input MUXes 60 and a plurality of sequentially coupled stages 62. For input, the MUXes 60 are coupled to buses 38, 40, and 48 (see also FIG. 1). Two output buses 64 and 66 couple the input MUXes 60 and the first stage 68. The input MUXes 60 are capable of selecting any one of five input images for output on either of buses 64 and 66. In the preferred embodiment, two output images are always produced on the buses 64 and 66 for delivery to the stages 62. The control of the input MUXes 60 is selected over the Multibus 50 by the control computer 18 (see also FIG. 1). Preferably, the MUXes 60 are implemented as look-up tables (LUTs).

In the preferred embodiment, the GLU 32 includes eight sequentially coupled stages 62 (FIG. 2). Optionally, more than one GLU can be sequentially inserted in the processor 12 to provide a multiple of eight stages (e.g., 16, 24, or 32). All GLUs would be coupled between the ALU 30 and the CLU 34.

Each of the stages 62 is generally identical with one another and includes two eight-bit input ports and two eight-bit output ports which feed the next stage. The output of the last stage 70 serves as the output for buses 42 and 44 which in the preferred embodiment are coupled to the CLU 34. In the event that a second GLU is included in the processor 12, the buses 42 and 44 are coupled to the next GLU (not shown). Each of the stages 62 receives control signals over the Multibus 50 from the control computer 18 (see also FIG. 1) to configure the stages as will be described for an image processing pass.

Geometric Logic Unit Staqe

A geometric logic unit (GLU) stage 68 (FIG. 3) corresponds to any one of the eight stages 62 illustrated in FIG. 2. For purposes of description, the stage 68 illustrated in FIG. 3 will be presumed to be the first stage. Basically, the stage 68 includes a digital programmable variable delay 72 and a function unit assembly 74. The variable delay 72 time delays the eight-bit signal received on bus 40 for subsequent utilization by the function unit assembly 74. The variable delay may be implemented by shift registers or as the multibit logical extension of the binary delay disclosed in U.S. patent application Ser. No. 559,438, filed Dec. 8, 1983, by Sternberg et al, now U.S. Pat. No. 4,665,551, entitled APPARATUS AND METHOD FOR IMPLEMENTING TRANSFORMATIONS IN DIGITAL IMAGE PROCESSING, the disclosure of which is specifically incorporated herein by reference. For each image pass, the delay 72 is dynamically programmable over the Multibus 50 by the control computer 18 (see also FIG. 1) to provide a delay in a given number of pixels (e.g., 511 pixels).

The function unit assembly 74 is illustrated conceptually in FIG. 3 and as actually implemented in FIG. 4. Turning to FIG. 3, the function unit assembly 74 includes an adder 76 and a logic unit 78. The adder 76 receives the eight-bit serial stream over bus 75 and adds a constant value to each eight-bit word in the serial stream. The signal exiting the adder 76 on the eight-bit bus 80 is referred to as the "enhanced" or "enhanced delayed" signal. The logic unit 78 operates on the undelayed signal received over eight-bit bus 38 and the enhanced signal received over bus 80. The logic unit outputs two eight-bit serial signals on the buses 82 and 84 for delivery to the next serially-coupled stage 62 which as described would be the second stage. The conceptual operation of the function unit assembly 74 as described in FIG. 3 corresponds to that described in U.S. patent application Ser. No. 644,101, the early Sternberg grayscale processor.

The actual implementation of the function unit assembly 74 is illustrated in FIG. 4. Basically, the function unit assembly 74 includes a conventional eight-bit arithmetic logic unit (ALU) assembly 86 and an ALU controller 88. The ALU assembly 86 should not be confused with the ALU 30 of FIG. 1. As noted above, the ALU 30 is a sophisticated ALU specifically adapted for image processing sold by Imaging Technologies Incorporated of Wolburn, Mass. The ALU 86 of FIG. 4 is a conventional eight-bit ALU and in the preferred embodiment is that sold as Model AM29501 by Advanced Micro Devices, Inc. of Sunnyvale, Calif.

The ALU 86 includes an input multiplexer 90, registers 92, an ALU multiplexer 94, an ALU 96, and an output multiplexer 98. The input MUX 90 receives three eight-bit inputs over buses 38, 75, and 100. The MUX 90 is capable of delivering any one of the three inputs to any one of the registers 92 over bus 102. The registers 92 are coupled to the ALU MUX 94 and the output of MUX 98 via bus 104. The ALU MUX 94 is capable of selecting any one or two of the registers 92 for application to the ALU 96 over eight-bit buses 106 and 108. The ALU 96 is capable of performing a wide variety of operations. In the preferred embodiment, the ALU 96 is capable of addition, subtraction, ANDing, ORing, exclusive ORing, and complementing. The eight-bit output of the ALU 96 is delivered to both the output MUX 98 and the input MUX 90 over bus 100. The output MUX 98 receives as input all of the registers 92 and the ALU output bus 100. The output MUX 98 is capable of selecting any one of the eight-bit words for output on the eight-bit buses 82 and 84.

The ALU controller 88 receives control signals over the Multibus 50 from the control computer 18 (see also FIG. 1) and in turn controls the input MUX 90, the registers 92, the ALU MUX 94, the ALU 96, and the output MUX 98. The implementation of the ALU controller 88 in view of this disclosure would be well within the capabilities of one having ordinary skill in the art.

At this point, it is helpful to put names on the various data at the various locations within the GLU stage 68 (FIG. 3). The data received over bus 38 is referred to as the fixed input data or F-IN. The data received over the bus 40 is referred to as the delayed input data or D-IN. The output of the variable delay 72 on bus 75 is referred to as the delayed data or D. The output of the adder 76 is referred to as the enhanced data or E. The output on bus 82 is referred to as the fixed output data or F-OUT. Finally, the data on output bus 84 is referred to as the delayed output data or D-OUT. The words "fixed" and "delayed" utilized in describing the various data is a matter of nomenclature based on the historical development of the processor and does not always technically refer to delayed and undelayed data. Indeed, on some occasions, the data on buses 38 and 40 will be identical; and on some occasions, the data on buses 82 and 84 will be identical.

Figure 5:
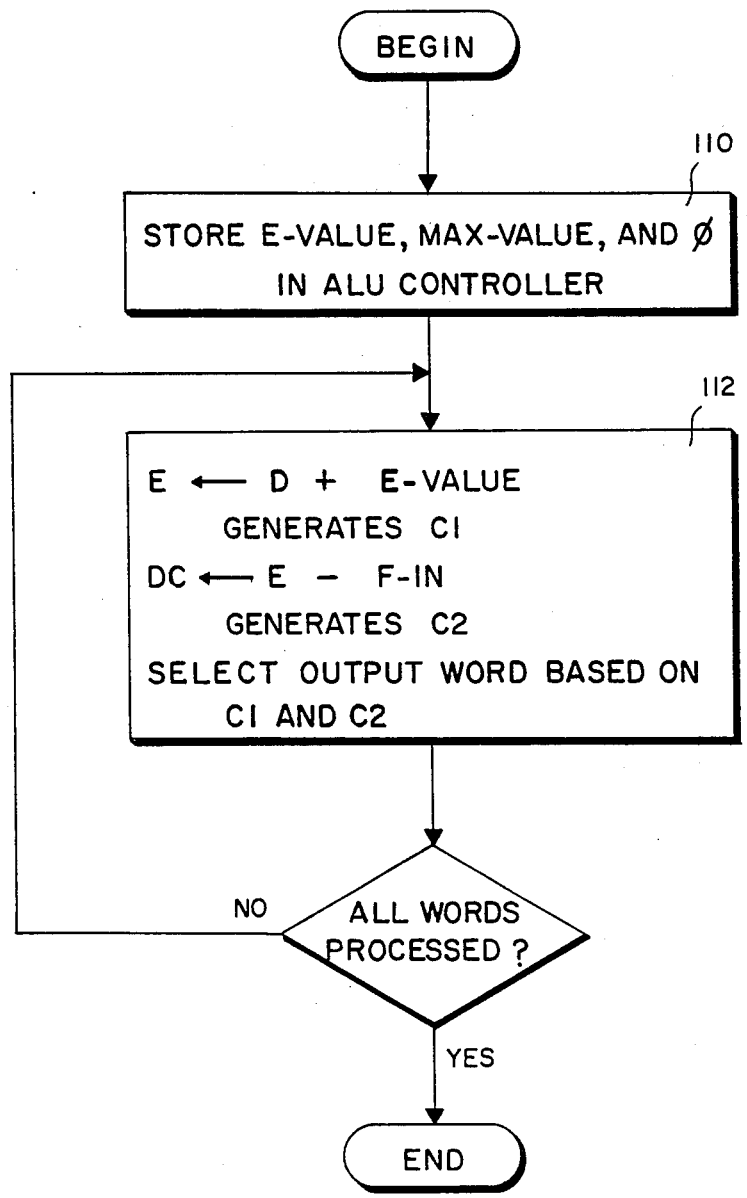
FIG. 5 is a flow chart illustrating the operation of the GLU stage function unit.

The operation of the function unit assembly 74 is illustrated in the flow chart of FIG. 5. Before data is received over buses 38 and 75, the ALU controller 88 must be conditioned with certain information over Multibus 50. As illustrated in block 110, an E-value, a MAX-value, and zero are stored in the ALU controller 88 prior to the reception of data on an imaging pass. The E-value is a constant value to be added to each eight-bit word in the delayed value. Conceptually, the E-value corresponds to the constant utilized by the adder 76 (FIG. 3). The MAX-value in the preferred embodiment corresponds to the largest value which can be stored in the eight-bit format. In the preferred embodiment, this is decimal 255 or hexadecimal FF. Finally, the value zero is utilized to prevent underflow which is simply a specialized version of overflow.

After the ALU controller is conditioned as illustrated in box 110, the first data words are received over buses 38 and 75. As discussed above, the data on bus 38 is referred to as F-IN while the data on bus 75 is referred to as D. The values F-IN and D received over buses 38 and 75 are stored in registers 92. The processing for each pair of input words received on buses 38 and 75 is illustrated in block 112. First, the enhanced data E is produced by adding the D data and the E-value. This addition generates a carry designated C-1 indicating whether overflow occurred during the addition, exceeding the maximum value 255. In the preferred embodiment, C-1 is zero if overflow did not occur and C-1 is one if overflow did occur. Both the value E and the status or overflow flag C-1 are stored in registers 92. Next, a "don't care" DC value is generated by subtracting the F-IN value from the E value in the ALU 96. This subtraction generates a status or overflow flag C-2 which indicates whether F-IN is larger than E. In the preferred embodiment, if F-IN is smaller than E, C-2 is zero; while if F-IN is larger than E, C-2 is one. As a result of the subtraction, only the status flag C-2 is stored in the registers 92. After the addition and subtraction are performed, the output multiplexer 98 makes an output decision for both of buses 82 and 84 depending on the status flags C-1 and C-2. This output decision is illustrated in greater detail in FIG. 6 which is a logic table showing the outputs for four basic morphological operations "clone", "collapse", "explode", and "implode". The meanings and description of these functions are well-known to those having skill in the art and are described in greater detail for the binary case in the referenced U.S. patent application Ser. No. 559,438. The clone operation for the grayscale case is described in the referenced U.S. patent application Ser. No. 644,101.

Turning first to the clone operation (FIG. 6) the outputs on buses 82 and 84, F-OUT and D-OUT, respectively, are either E, F-IN, or the LIMIT value. If C-1 is one, indicating that overflow occurred during the enhancement addition, the limit value is outputted on both of buses 82 and 84 to "clip" the data at the maximum value. Clipping the data at the maximum value facilitates future processing and makes recovery much easier. If C-1 is zero indicating that overflow did not occur during the enhancement addition, all numbers are within range. In this case, the output decision is made based on the value C-2 which indicates whether E or F-IN is greater. The greater of the two values is outputted on both of buses 82 and 84 as F-OUT and D-OUT.

The explode operation (FIG. 6) is generally identical to the clone operation just described with the exception that the F-IN data is always outputted as the F-OUT data. The D-OUT data is identical to that of the clone operation.

The collapse operation (FIG. 6) is the converse of the clone operation. Whereas in a clone the enhancement value is added and then a maximum value selection is made, in the collapse operation the enhancement value is subtracted, and a minimum selection is made. If C-1 has the value one for any word pair during the collapse operation, a zero is outputted on both of buses 82 and 84 as F-OUT and D-OUT. This prevents underflow to maintain the numbers within range in the eight-bit format. If the C-1 value is zero, the output decision is made on the basis of C-2 to select the minimum of F-IN and E.

Finally, the implode operation (FIG. 6) is identical to the collapse operation with the exception that the F-IN data is always outputted on bus 82 as the F-OUT data. The D-OUT data corresponds identically to the collapse operation.

Of course, other truth tables could be generated to effect the performance of other operations. Additionally, different status flags generated during the addition and/or subtraction could be utilized to make the outputting decisions. Although the truth table of FIG. 6 implements the bounded unsigned situation, the method can be logically extended to unbounded and signed situations. All of these variations are intended to fall within the scope of the appended claims.

The above description is that of a preferred embodiment of the invention. Various changes and alterations can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. An image processor for processing a digital signal representative of a grayscale image made up of a matrix of points, the digital signal being a plurality of serial multibit words each corresponding to one of the image points, said processor including a logic unit through which the digital signal is passed, said logic unit comprising:
   input port means for receiving the digital signal;
   delay means for delaying the digital signal to produce a delayed signal;
   memory means for storing a dynamically selectable constant enhancement value and a dynamically selectabel constant limit value;
   control means for dynamically selecting the enhancement value and the limit value;
   an arithmetic logic unit (ALU) means including means for adding or subtracting the constant enhancement value to each word in the delayed signal to produce an enhanced signal, said ALU means further including a first status flag indicative of whether overflow occurred as a result of said addition or subtraction, said ALU means further including means for subtracting each word of one of the enhanced and digital signals from each corresponding word of the other of the enhanced and digital signals, said ALU means further including a second status flag indicative of whether overflow occurred as a result of said subtraction; and
   output means for outputting an output signal, said output means including selector means responsive to the first and second status flags for selecting each word of the output signal from one of the constant limit value, the corresponding word from the digital signal, and the corresopnding word from the enhanced signal.

2. An image processor as defined in claim 1 wherein each of said first and second status flags comprises a binary signal and further wherein said output selector means comprises a multiplexer driven by a select signal including said first and second status flags.

3. An image processor as defined in claim 2 wherein said multiplexer outputs the limit value when said first status flag is set.

4. An image processor as defined in claim 3 wherein said multiplexer outputs one of the input signal word and the enhanced signal word when the first status flag is not set.

5. An image processor as defined in claim 1 wherein the limit value is the largest number representable in one of the multibit words.

6. An image processor as defined in claim 1 wherein the limit value is zero.

7. An image processor as defined in claim 1 wherein said ALU means comprises a single arithmetic logic unit digital device.

8. A method of processing a digital signal representative of a grayscale image made up of a matrix of points, the digital signal being a plurality of serial multibit words each corresponding to one of the image points, said method comprising:
   receiving the digital signal;
   delaying the digital signal to produce a dealyed signal;
   dynamically selecting a constant enhancement value and a constant limit value;
   adding or subtracting the constant enhancement value to each word in the delayed signal to produce an enhanced signal noting whether overflow occurs;
   subtracting each word in one of the enhanced and digital signals from the corresponding word in the other of the enhanced and digital signals noting whether overflow occurs;
   selecting the constant limit value, the enhanced signal word, or the digital signal word depending on whether overflow occurred on either or both of the preceding steps; and
   outputting the selected values as a serial output signal.

9. A method as defined in claim 8 wherein said selecting step comprises multiplexing the limit value, the enhanced signal words, and the digital signal words using overflow status flags generated by said adding and subtracting steps as a select signal.

10. A method as defined in claim 9 wherein said multiplexing step comprises selecting the limit value when overflow occured on said first adding or subtracting step.

11. A method as defined in claim 10 wherein said multiplexing step comprises selecting one of the digital signal word and the enhanced signal word when overflow did not occur on said first adding or subtracting step.

12. A method as defined in claim 8 wherein the limit value is the maximum number representable in one of the multibit words.

13. A method as defined in claim 8 wherein the limit value is zero.

* * * * *